United States Patent
Liang

(10) Patent No.: US 9,082,160 B2
(45) Date of Patent: Jul. 14, 2015

(54) IMAGE PROCESSING METHOD, IMAGE COMPRESSION DEVICE AND MOBILE TERMINAL

(71) Applicants: UC MOBILE LIMITED, Beijing (CN); GUANGZHOU UCWEB COMPUTER TECHNOLOGY CO., LTD, Guangzhou (CN)

(72) Inventor: Jie Liang, Guangzhou (CN)

(73) Assignees: UC MOBILE LIMITED, Beijing (CN); GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 0 days.

(21) Appl. No.: 14/128,861

(22) PCT Filed: Dec. 4, 2012

(86) PCT No.: PCT/CN2012/085869
§ 371 (c)(1),
(2) Date: Dec. 23, 2013

(87) PCT Pub. No.: WO2013/083032
PCT Pub. Date: Jun. 13, 2013

(65) Prior Publication Data
US 2014/0212033 A1    Jul. 31, 2014

(30) Foreign Application Priority Data
Dec. 5, 2011 (CN) .......................... 2011 1 0400101

(51) Int. Cl.
*G06T 9/00*  (2006.01)
*H04N 1/64*  (2006.01)

(52) U.S. Cl.
CPC . *G06T 9/00* (2013.01); *H04N 1/642* (2013.01)

(58) Field of Classification Search
None
See application file for complete search history.

(56) References Cited

U.S. PATENT DOCUMENTS

| 6,683,980 B1 | 1/2004 | Meier et al. | |
| 2002/0146166 A1* | 10/2002 | Rao et al. | 382/164 |
| 2008/0046410 A1* | 2/2008 | Lieb | 707/3 |
| 2008/0284791 A1* | 11/2008 | Bressan et al. | 345/589 |

FOREIGN PATENT DOCUMENTS

| CN | 101068350 A | 11/2007 |
| CN | 102497489 A | 6/2012 |

OTHER PUBLICATIONS

Su Ze-Yang, Teng Fei A "Self-Similar Background" Image Compression Method Computer Technology and Application Evolvement, Dec. 31, 2009, pp. 450-455.

* cited by examiner

*Primary Examiner* — Bernard Krasnic
(74) *Attorney, Agent, or Firm* — Anova Law Group, PLLC

(57) ABSTRACT

The present invention provides an image compression method, comprising: determining non-edge portions of an image to be compressed by performing an image edge detection on the image to be compressed; dividing each of non-edge portions into a plurality of connected domains of pixels according to color similarity of the pixels in the non-edge portion, wherein each of the connected domains of pixels is composed of a pixel selected during the division into connected domains of pixels and the pixels similar in color to and continuously adjacent to the selected pixel; setting the color of each of the connected domains of pixels to be the color of the selected pixel; merging the colors of a plurality of divided connected domains of pixels according to similarity of the colors of the connected domains of pixels; and compressing the image to be compressed by using the merged colors. According to the method, the number of colors used for image compression can be determined according to the characteristics of the image, thus the file size of the compressed image can be effectively reduced with the display effect thereof kept substantially unchanged.

12 Claims, 12 Drawing Sheets

| Image effect | Number of colors | File size/bytes |
|---|---|---|
|  | 256 | 2989 |
|  | 32 | 1911 |
|  | 16 | 1507 |
|  | 8 | 1205 |
|  | 4 | 716 |
|  | 3 | 641 |
|  | 2 | 514 |

| Image effect | Number of colors | File size/bytes |
|---|---|---|
|  | 256 | 5544 |
|  | 32 | 2838 |
|  | 16 | 2237 |
|  | 8 | 1607 |
|  | 4 | 1086 |
|  | 2 | 850 |

IMAGE PROCESSING METHOD, IMAGE COMPRESSION DEVICE AND MOBILE TERMINAL

CROSS REFERENCES TO RELATED APPLICATIONS

This application claims priority of PCT Patent Application No. PCT/CN2012/085869, filed on Dec. 4, 2012, which claims priority of Chinese Patent Application No. 201110400101.4, filed on Dec. 5, 2011, the entire contents of both of which are incorporated by reference herein.

FIELD OF THE INVENTION

The present invention relates to the technical field of image processing, and more particularly to a method and a device for performing image compression by dividing domains similar in color and adjusting number of colors used for image compression, and a mobile terminal provided with the device.

BACKGROUND

With the development of information technology, more and more image or video files with a vivid and intuitive display effect are used as substitutes for traditional text files to record and transmit information, and the amount of information is getting bigger and bigger. Since the data amount of images and videos is very great, the storage and transmission thereof are quiet inconvenient, thus an effective compression on the data is necessary for either storage or transmission.

Image compression is an application of data compression technology to digital images. Its purpose is to reduce redundant information in image data so as to store and transmit data in highly effective formats, which has great significance in rapid transmission and real time processing of digital image information on the network.

The reason why image data can be compressed is that there exists redundancy in the data. Redundancies in image data can be mainly classified into spatial redundancy caused by the correlations between adjacent pixels in an image, temporal redundancy caused by the correlations between different frames in an image sequence, and spectrum redundancy caused by the correlations between different color planes or spectral bands. The purpose of data compression is to reduce the data redundancies so as to reduce the number of bits required for representing the data.

In image compression applications, the ideal compression is a compression with an effect of low image capacity and high image quality (definition), which can be realized by choosing a suitable output format according to the characteristics of an image. Image formats used in the Internet mainly include GIF format, PNG format and JPG format, wherein JPG format is a lossy compression format, it is suitable for compression and storage of images having complicated colors such as landscape images, but can lead to loss of image data; GIF format and PNG format are image compression formats based on color pallet technology, and the number of colors adopted when an image is compressed with GIF and PNG formats is a very important compression parameter. As far as a GIF or PNG formatted image is concerned, the file size of the image can be effectively reduced with the display effect thereof kept substantially unchanged by appropriately adjusting the number of colors of the image.

At present, images are generally compressed according to a predetermined number of colors, rather than the numbers of colors suitably selected based on the characteristics of the images, in computer image conversion. Under such a circumstance, images having different or even very different numbers of colors are compressed according to a same predetermined compression parameter rather than the actual numbers of colors of the images, which leads to either a case where the number of colors is set too high and thus the compression efficiency is not high, or a case where the number of colors is set too low and thus the display effect is not good, therefore, the file size and the display effect of the compressed images cannot be well balanced.

SUMMARY

In view of the above problems, an object of the present invention is to provide an image compression method and an image compression device for performing image compression by dividing domains similar in color and adjusting number of colors used for image compression.

Moreover, another object of the present invention is to provide a mobile terminal provided with the above mentioned image compression device.

According to an aspect of the present invention, there is provided an image compression method, comprising steps of: determining non-edge portions of an image to be compressed by performing an image edge detection on the image to be compressed; dividing each of the determined non-edge portions into a plurality of connected domains of pixels according to color similarity of the pixels in the non-edge portion, wherein each of the connected domains of pixels is composed of a pixel selected during the division into the connected domains of pixels and the pixels similar in color to and continuously adjacent to the selected pixel; setting the color of each of the connected domains of pixels to be the color of the pixel selected during the division into the connected domains of pixels; merging the colors of a plurality of divided connected domains of pixels according to similarity of the colors of the connected domains of pixels, wherein the connected domains of pixels having similar colors will be merged into one connected domain of pixels having a same color; and compressing the image to be compressed by using the merged colors.

In one or more examples of the above aspect, the step of dividing each of the determined non-edge portions into a plurality of connected domains of pixels according to color similarity of the pixels in the non-edge portion may comprise: selecting a pixel from the pixels of the non-edge portion; searching pixels similar in color to and continuously adjacent to the selected pixel, starting from the pixel; forming a connected domain of pixels with the searched pixels and the selected pixel; and selecting another pixel in the remaining pixels that are not divided into connected domains of pixels yet and repeating the above procedure of forming a connected domain of pixels, till the pixels in the non-edge portion are all divided into connected domains of pixels.

In one or more examples of the above aspect, Sobel edge detection algorithm may be used to perform the image edge detection on the image to be compressed.

In one or more examples of the above aspect, the step of merging the colors of a plurality of divided connected domains of pixels according to similarity of the colors of the connected domains of pixels may comprise: selecting a connected domain of pixels from the plurality of connected domains of pixels; determining connected domains of pixels similar in color to the selected connected domain of pixels from the other connected domains of pixels in the plurality of connected domains of pixels; modifying the colors of the connected domains of pixels similar in color to the selected connected domain of pixels into the color of the selected connected domain of pixels; and selecting another connected domain of pixels from the remaining connected domains of pixels that are not subject to a color merging process yet and repeating the above procedure, till all the connected domains of pixels are subject to a color merging process.

In one or more examples of the above aspect, the similarity of the colors may be determined by calculating a difference value between two colors.

In one or more examples of the above aspect, two colors are similar if the difference value between the two colors is less than a predetermined threshold.

According to another aspect of the present invention, there is provided an image compression device, comprising: a non-edge portion determining unit for determining non-edge portions of an image to be compressed by performing an image edge detection on the image to be compressed; a connected-domain-of-pixels dividing unit for dividing each of the determined non-edge portions into a plurality of connected domains of pixels according to color similarity of the pixels in the non-edge portion, wherein each of the connected domains of pixels is composed of a pixel selected during the division into the connected domains of pixels and the pixels similar in color to and continuously adjacent to the selected pixel; a color setting unit for setting the color of each of the connected domains of pixels to be the color of the pixel selected during the division into the connected domains of pixels; a color merging unit for merging the colors of a plurality of divided connected domains of pixels according to similarity of the colors of the connected domains of pixels, wherein the connected domains of pixels having similar colors will be merged into one connected domain of pixels having a same color; and a compressing unit for compressing the image to be compressed by using the merged colors.

In one or more examples of the above aspect, the connected-domain-of-pixels dividing unit may comprise: a first selecting module for selecting a pixel from the pixels of the non-edge portion; a searching module for searching pixels similar in color to and continuously adjacent to the selected pixel, starting from the pixel; a forming module for forming a connected domain of pixels with the searched pixels and the selected pixel; a first deciding module for deciding whether all the pixels in the non-edge portion are divided, wherein if the first deciding module decides that there exist remaining pixels that are not divided yet, the first selecting module, the searching module and the forming module will repeatedly performed treatments on the remaining pixels.

In one or more examples of the above aspect, the color merging unit may comprise: a second selecting module for selecting a connected domain of pixels from the plurality of connected domains of pixels; a determining module for determining connected domains of pixels similar in color to the selected connected domain of pixels from the other connected domains of pixels in the plurality of connected domains of pixels; a color modifying module for modifying the colors of the connected domains of pixels similar in color to the selected connected domain of pixels into the color of the selected connected domain of pixels; and a second deciding module for deciding whether all the connected domains of pixels are subject to a color merging process, wherein if the second deciding module decides that there exist remaining connected domains of pixels that are not subject to a color merging process yet, the second selecting module, the determining module and the color modifying module will repeatedly performed treatments on the remaining connected domains of pixels.

In one or more examples of the above aspect, the similarity of the colors may be determined by calculating a difference value between two colors.

In one or more examples of the above aspect, two colors are similar if the difference value between the two colors is less than a predetermined threshold.

According to yet another aspect of the present invention, there is provided a mobile terminal, comprising the above mentioned image compression device.

According to the above mentioned image compression method and image compression device, the number of colors used for image compression is suitably obtained by dividing connected domains of pixels similar in color and merging the colors of the connected domains of pixels, and the image is compressed by using the obtained number of colors, it is advantageous in that the number of colors of an image to be compressed can be pertinently determined according to the characteristics of the image, thus the file size of the compressed image can be effectively reduced with the display effect thereof kept substantially unchanged, that is, the file size and the display effect of the compressed image can be well balanced. The above mentioned method and device are especially applicable to the occasions that have high requirements on image compression ratio, such as mass image storage and low speed network.

In order to realize the above described and other related purposes, one or more aspects of the present invention comprise the features described in details in the following contexts and specifically indicated in the claims. The following description and the accompanying drawings will illustrate in details some of the exemplified aspects of the present invention. However, those indicated in the aspects are only some of ways in which the principles of the present invention can be applied. In addition, the present invention is intended to include all the aspects and the equivalents thereof.

BRIEF DESCRIPTION OF DRAWINGS

The above and other objects, features and advantages of the present invention will become apparent from the following description given in conjunction with the accompanying drawings. In the drawings.

DETAILED DESCRIPTION

Specific embodiments of the present invention will be described in details below with reference to the accompanying drawings.

First Embodiment

Figure 1:
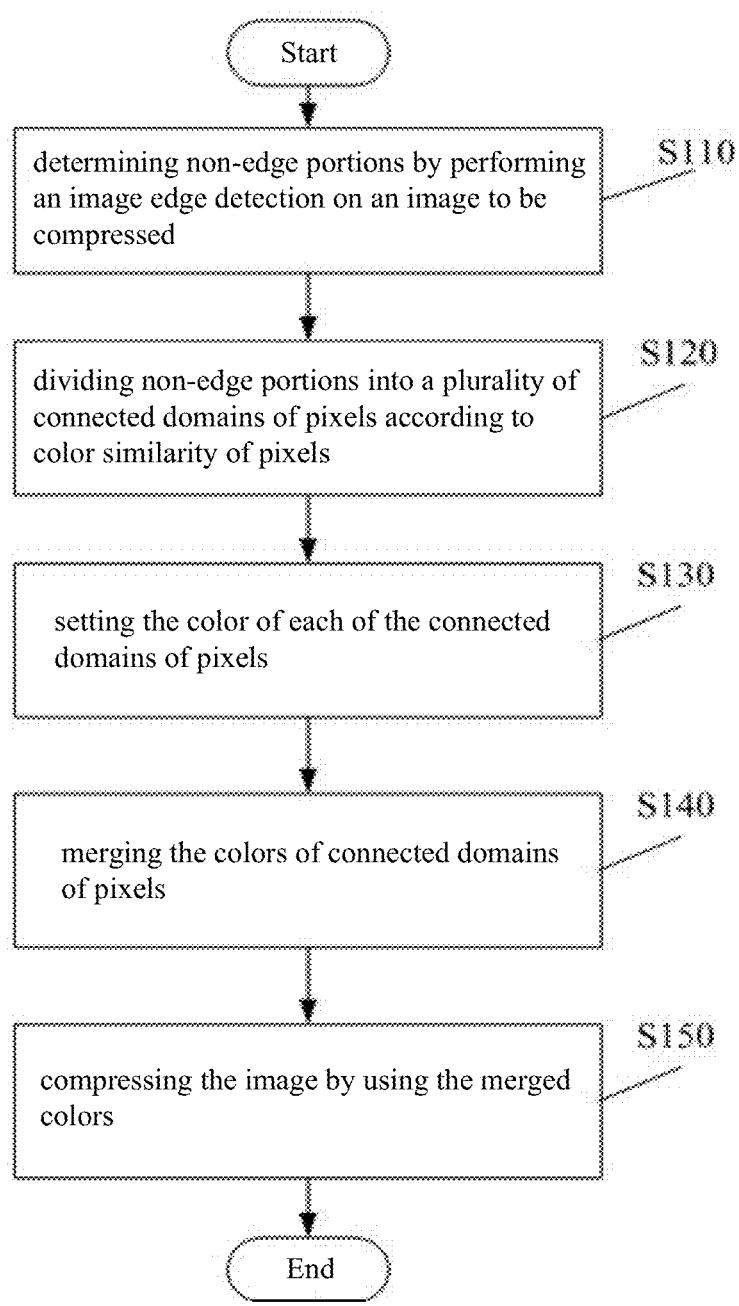
FIG. 1 is a flowchart showing an image compression method according to a first embodiment of the present invention.

FIG. 1 is a flowchart showing an image compression method according to a first embodiment of the present invention.

As shown in FIG. 1, in order to set a suitable number of colors for image compression according to the number of colors of an image itself in a process for compressing the image, first, an image edge detection needs to be performed on the image to be compressed to detect the edges of the image to be compressed, and thus determine the non-edge portions of the image to be compressed (step S110).

Edges are the most fundamental features of an image, an edge refers to a set of pixels in the image around which the pixels have a step-like change or a roof-like change in the gray scale. Edges exist between an object and a background, an object and another object, a domain and another domain, or an element and another element, and are important references for dividing or identifying an image.

Since the image formats such as GIF and PNG are suitable for compressing a simple line type image, the GIF and PNG formatted images on the Internet are generally used for simple images, such as cartoon images, logo images, button image etc., and are seldom used for landscape images and human images. According to human vision, the number of colors of a GIF and PNG formatted image is generally not very large, for example, the Sina logo includes only three colors of red, black and white, and the Baidu logo includes only three colors of red, blue and white. But in computer image processing, the edge portions of the GIF and PNG formatted image needs to include some transition colors to achieve a smooth edge transition (i.e. the edge anti-aliasing), which will result in a large total number of image colors. If transition colors are not used for the edge portions of the image, the edge portions of the image will look rigid, although the image effect remains substantially unchanged. Therefore, the edges of the image need to be detected to find out the edge portions of the image, and different processing methods need to be applied to the edge portions and the non-edge portions of the image, respectively. The transition colors of the edges will be ignored in a compressing process, so that the optimal number of image colors can be determined for the image compression.

Image edge detection is a technology of locating the edges of an object in a 2D or 3D image, and it generally comprises four steps of filtering, enhancing, detecting and locating. There are a lot of optional image edge detection algorithms in the prior art of image processing. Sobel edge detection algorithm is adopted in a preferred embodiment of the present invention. The Sobel edge detection algorithm is advantageous in that it has a high detection speed, has a function of smoothing and suppressing noise, and can achieve a better edge detection effect.

After the edge portions and the non-edge portions of the image to be compressed are determined, the non-edge portions are divided into a plurality of connected domains of pixels according to color similarity of the pixels in the determined non-edge portions, wherein each of the connected domains of pixels is composed of a pixel selected during the division into the connected domains of pixels and the pixels similar in color to and continuously adjacent to the selected pixel (step S120). Herein, the term "continuously adjacent" means that if a first pixel is adjacent to a second pixel and the second pixel is adjacent to a third pixel, then the second pixel and the third pixel are referred to as pixels continuously adjacent to the first pixel. It will be described below with reference to FIG. 2 how to divide the connected domains of pixels in the non-edge portions.

In addition, the similarity judgment of colors can be done by calculating the difference value between two colors. If the difference value between the two colors is smaller than a predetermined threshold, then it can be determined that the two colors are similar. The value range of the predetermined threshold can be flexibly determined according to the specific requirements on image compressing. In a preferred embodiment of the present invention, the abs function is used to determine the similarity between two colors, wherein the abs function is a function for returning the absolute value of a specified number. Specifically, as an example, a pixel is usually represented by a binary number of 32 bits in a computer, wherein red, green, blue and transparency each are represented by 8 bits. If pixel 1 is assumed to be (r1, g1, b1, a1), pixel 2 is assumed to be (r2, g2, b2, a2), then the difference value of the two colors will be abs(r1−r2)+abs(g1−g2)+abs(b1−b2)+abs(a1−a2). If the predetermined threshold is 32, then two colors are determined to be similar colors when the difference value thereof is smaller than 32. The edge portions of an image to be compressed will be ignored when similar color domains of the image are determined, since the edge portions of the image are mainly composed of transition colors.

After a determined non-edge portion is divided into a plurality of connected domains of pixels, the color of each of the connected domains of pixels is set to be the color of the pixel selected during the division into the connected domains of pixels (step S130).

Then, the colors of a plurality of divided connected domains of pixels are merged according to similarity of the colors of the connected domains of pixels (step S140), wherein connected domains of pixels having similar colors will be merged into one connected domain of pixels having a same color. The color merging process of the connected domains of pixels will be described below with reference to FIG. 3.

After the color merging process, the image to be compressed will be compressed according to the colors of the connected domains of pixels obtained after the color merging process (step S150). Specifically, the corresponding connected domains of pixels in the image to be compressed are compressed according to the colors thereof, and thus the image compressing process is implemented.

Figure 2:
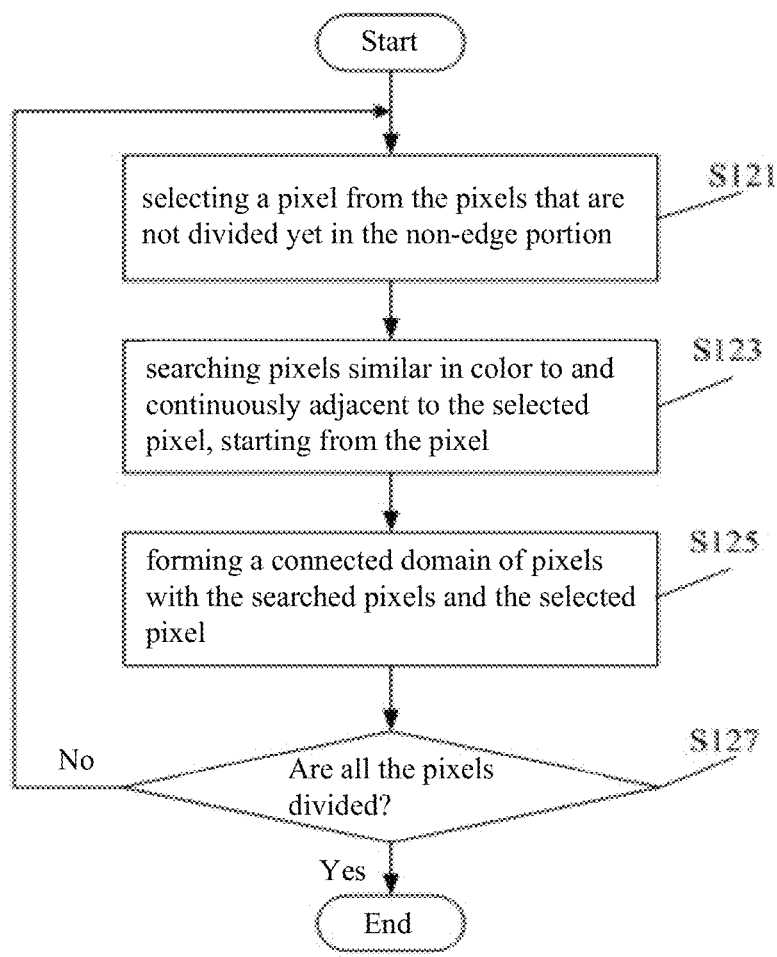
FIG. 2 is a flowchart showing an example of the process of dividing the connected domains of pixels.

FIG. 2 is a flowchart showing an example of the process of dividing the connected domains of pixels.

As shown in FIG. 2, first, in step S121, a pixel is selected from the pixels in the determined non-edge portions that are not divided yet, wherein the pixel can be arbitrarily selected. For example, a basic pixel A can be arbitrarily selected. In addition, when the pixel is first selected, the pixels that are not divided yet include all pixels in the non-edge portions.

Then, in step S123, starting from the selected pixel (pixel A), pixels similar in color to and continuously adjacent to the selected pixel are searched in the pixels that are not divided yet. The definition and the determination of the terms "similar in color" and "continuously adjacent" have been described above in the description of step S120.

After the pixels similar in color to and continuously adjacent to the selected pixel are searched out, in step S125, the searched pixels and the selected pixel form a connected domain of pixels.

Then, in step S127, it is determined whether all the pixels in the non-edge portions are divided. If they are all divided, then the process comes to an end and the flow returns to step S130. Otherwise, the flow returns to step S121, another pixel (such as pixel B) is selected as a basic pixel in the remaining pixels that are not divided yet and the above procedure is repeated till all the pixels are divided.

Figure 3:
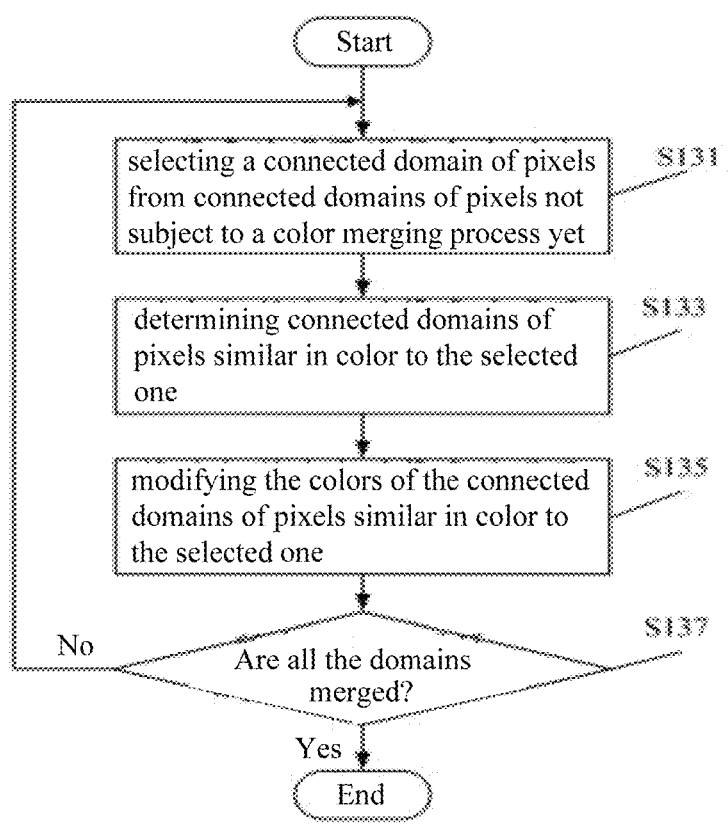
FIG. 3 is a flowchart showing an example of a color merging process of connected domains of pixels.

FIG. 3 is a flowchart showing an example of a color merging process of connected domains of pixels.

As shown in FIG. 3, first, in step S131, a connected domain of pixels is selected from the connected domains of pixels that are not merged yet in the plurality of connected domains of pixels, for example, a connected domain of pixels 1 is selected.

Then, in step S133, connected domains of pixels similar in color to the selected connected domain of pixels are determined. Specifically, a comparison is made between the color of the selected connected domain of pixels and the colors of all other connected domains of pixels, that is, a comparison is made between the color of the basic pixel based on which the selected connected domain of pixels is formed (such as the color of the basic pixel of the connected domain of pixels 1) and the colors of the basic pixels based on which other connected domains of pixels are formed. If two colors are similar, then it is determined that the corresponding two connected domains of pixels are similar in color, and otherwise, it is determined that the two connected domains of pixels are not similar in color.

After the connected domains of pixels similar in color are determined, in step S135, the colors of the connected domains of pixels similar in color to the selected connected domain of pixels are modified into the color of the selected connected domain of pixels.

Then, in step S137, it is determined whether the connected domains of pixels are all subject to a color merging process. If they are, then the process comes to an end and the flow returns to step S150. Otherwise, another connected domain of pixels is selected from the remaining connected domains of pixels that are not subject to a color merging process yet, and the above procedure is repeated till all the connected domains of pixels are subject to a color merging process.

FIGS. 4a-4e are schematic diagrams showing an example of compressing a GIF image by applying the image compression method according to a first embodiment of the present invention.

Figure 4A:
FIGS. 4a-4e are schematic diagrams showing an example of compressing a GIF image by applying the image compression method according to a first embodiment of the present invention.
Figure 4A:
Figure 4A:
Figure 4A:
Figure 4A:
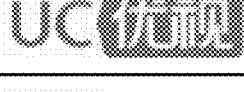
Figure 4A:
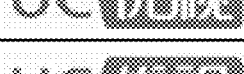
Figure 4A:
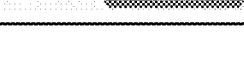
Figure 4B:
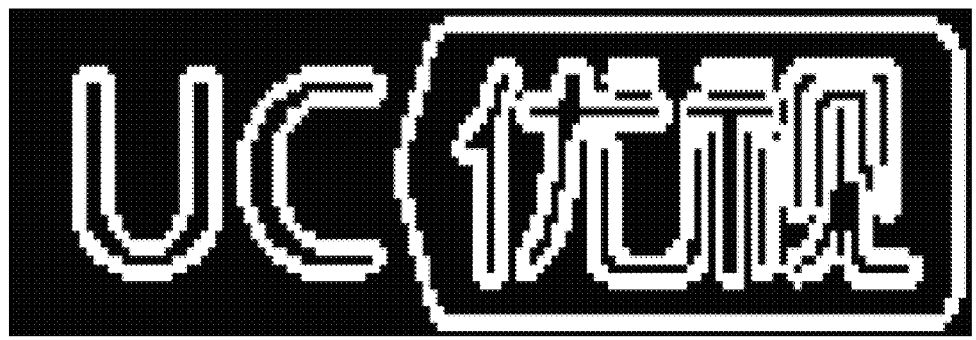

FIG. 4a is a table showing a comparison of GIF image effects, numbers of colors and file sizes of an icon. As shown in FIG. 4a, the file size of the image is reduced and the edges of the image become rigid when the number of colors of the image is reduced, however, the image effect is substantially unchanged when the number of colors is larger than 4. FIG. 4b is a schematic diagram showing the effect obtained by performing Sobel edge detection on the original image shown in FIG. 4a (the original image does not have a fixed number of colors, however, GIF format only supports a maximum of 256 colors while PNG and JPG formats can support more colors), wherein the hollow portions represent the edge portions, and the color filled portions represent the non-edge portions. An image shown in FIG. 4c can be obtained when the edge portions and the non-edge portions of the said image are determined and the domains similar in color are connected in the non-edge portions, wherein the connected domains of similar colors can be represented by one color, and the color of each of the connected domains is used as an entry in a first compression list. The connected domains of different similar colors are represented by different colors.

Figure 4C:
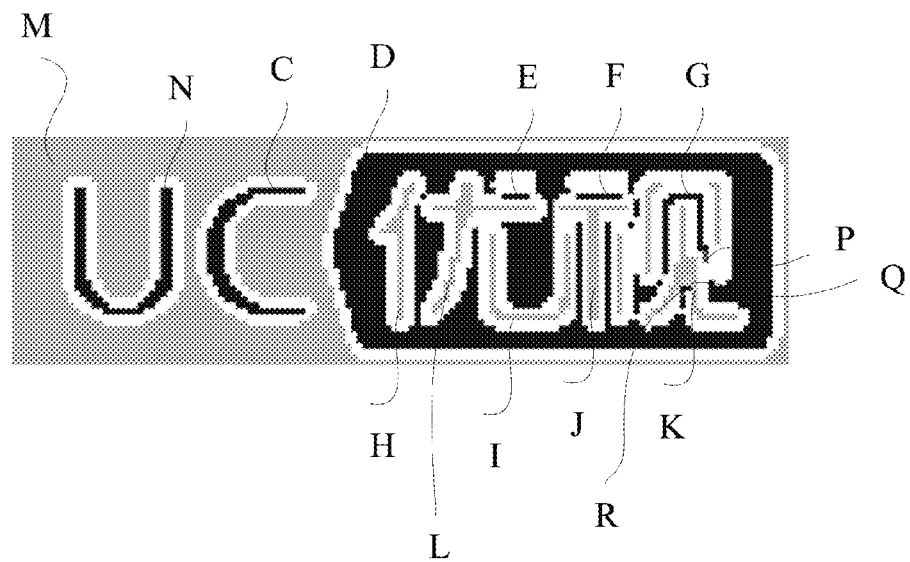

Specifically, the image shown in FIG. 4c comprises a plurality of connected domains, such as domains C, D, E, F, G, H, I, J, K, L, M, N, P, Q and R. In this case, domain M may be represented by a color, such as green; domains N, C, D, E, F and G are connected domains of similar colors, and may be represented by a same color, such as blue; domains H, I, J, K and L are connected domains of similar colors, and may be represented by a same color, such as brown; domain P is a connected domain and may be represented by a color, such as green; domain Q is a connected domain and may be represented by a color, such as cyan; and, domain R is a connected domain and may be represented by a color, such as black.

It can be understood that the above mentioned specific colors representing the connected domains of different similar colors are not necessarily the actual colors thereof, they are used only for the purpose of distinction, and thus can be substituted with other colors. It needs to be indicated that connected domains of different similar colors may also be represented by different patterns in stead of different colors, such as a stripe pattern, a dot pattern and so on, as long as the connected domains of different similar colors can be distinguished.

Figure 4D:
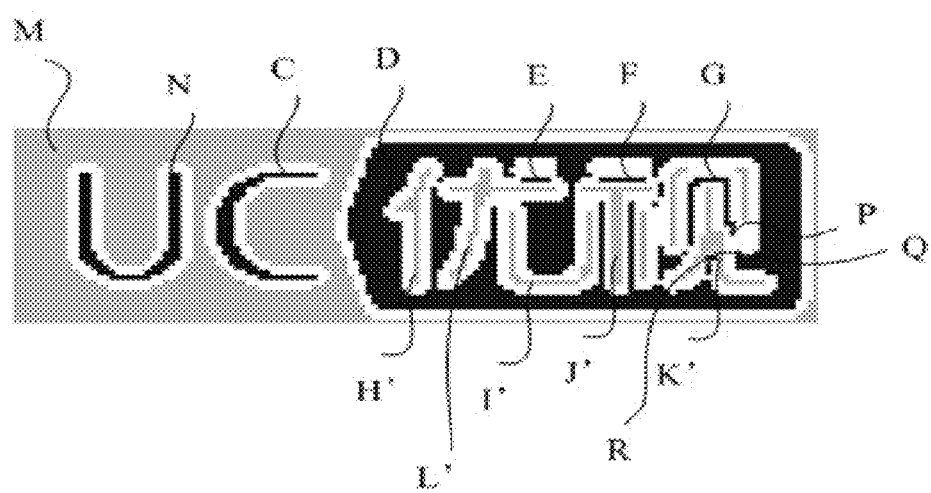
Figure 4E:

The colors of all the connected domains (i.e. the colors in the first compression list) are subject to a color merging process, and thus a final image compression color list can be obtained, wherein the number of colors is visually shown in FIG. 4d. Specifically, domain M and domains H, I, J, K and L are domains of similar colors, the plurality of domains become domains M, H', I', J', K' and L' after being subject to a color merging process, which may be represented by one color, such as green. In the embodiment shown in FIG. 4d, the suitable number of colors finally obtained is 5, i.e., domains M, H', I', J', K' and L' have a first color, domains N, C, D, E, F and G have a second color, domain P has a third color, domain Q has a fourth color and domain R has a fifth color, wherein the edge portions are excluded. The colors in FIG. 4d only constitute an example possessing a suitable number of colors, they are not necessarily actual colors. Finally, the image is compressed by using 5 colors mentioned above to produce a compressed image with a file size of 793 bytes, the display effect of which is shown in FIG. 4e.

Figure 5A:
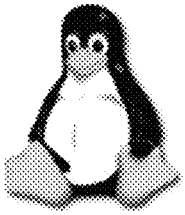
FIG. 5a-5c are schematic diagrams showing another example of compressing a GIF image by applying the image compression method according to a first embodiment of the present invention.
Figure 5A:
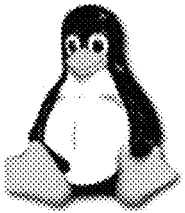
Figure 5A:
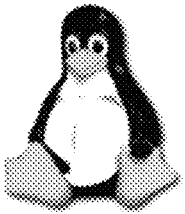
Figure 5A:
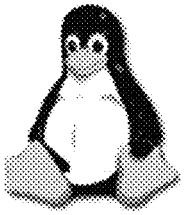
Figure 5A:
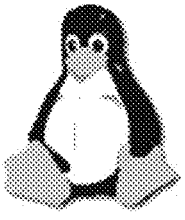
Figure 5A:
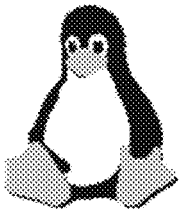
Figure 5B:
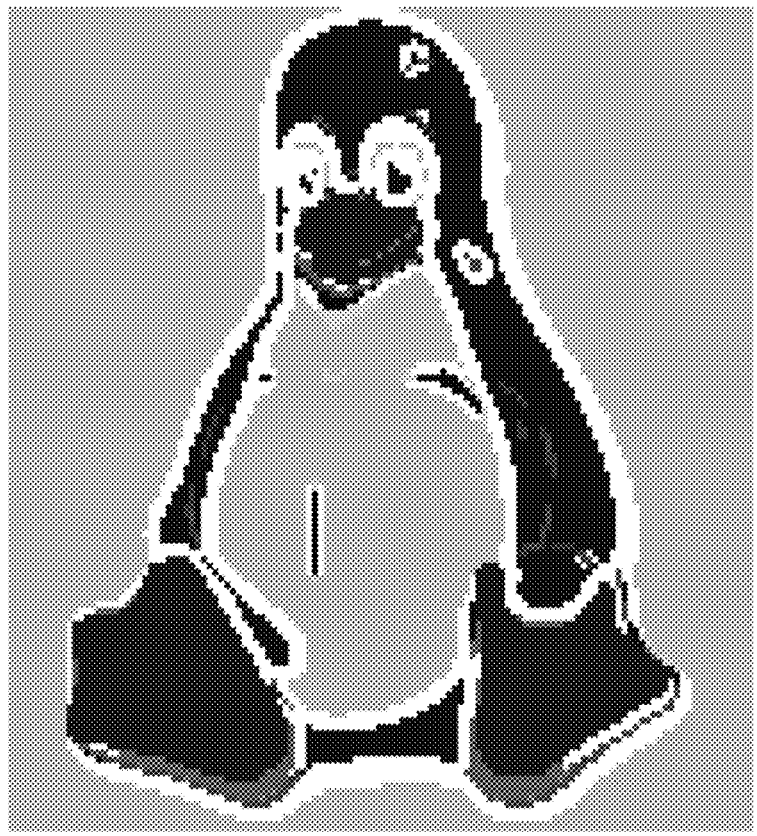
Figure 5C:
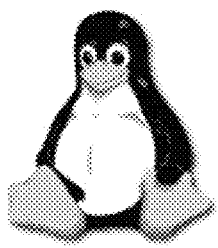

FIG. 5a, FIG. 5b and FIG. 5c are schematic diagrams showing another example of compressing a GIF image by applying the image compression method according to the first embodiment of the present invention.

FIG. 5a is another table showing a comparison of image effects, numbers of colors and file sizes of a GIF picture. As shown in FIG. 5a, the file size of the image is reduced and the display effect of the image becomes deteriorated when the number of colors of the image is reduced, however, the image effect is substantially unchanged when the number of colors is larger than 16.

An analysis result shown in FIG. 5b can be obtained after an edge detection, a division of connected domains similar in color and a similar color merging process are performed on the image shown in FIG. 5a (the original image is analyzed, and the original image does not have a fixed number of colors), wherein the suitable number of colors obtained is 11. The image is compressed by adopting the suitable number of colors to produce a compressed image with a file size of 1956 bytes, the display effect of which is shown in FIG. 5c.

In the present embodiment, a method is applied that determines the number of colors used for compression of an image according to the color characteristics of the image, so that the number of colors of the image can be pertinently determined according to the characteristics of the image to be compressed. In occasions that have high requirements on image compression ratio, such as mass image storage or low speed network, if an image is compressed according to a suitably selected number of colors, then the file size of the image can be effectively reduced with the image effect kept substantially unchanged, thus a good balance can be achieved between the file size and the display effect of the image.

The image compression method according to the first embodiment of the present invention has been described with reference to FIG. 1 to FIG. 5c. The image compression method according to the above mentioned embodiment of the present invention can be implemented in software, hardware or a combination thereof.

Figure 6:
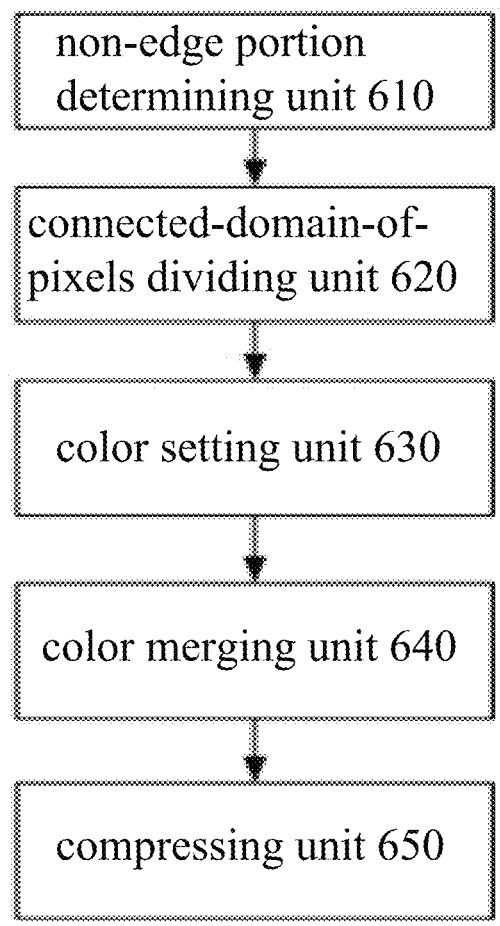
FIG. 6 is a schematic block diagram showing an image compression device according to a first embodiment of the present invention.

FIG. 6 is a schematic block diagram showing an image compression device 600 according to a first embodiment of the present invention. As shown in FIG. 6, the image compression device 600 comprises a non-edge portion determining unit 610, a connected-domain-of-pixels dividing unit 620, a color setting unit 630, a color merging unit 640 and a compressing unit 650.

When an image compression is performed on an image, the non-edge portion determining unit 610 determines the non-edge portions of the image to be compressed by performing an image edge detection on the image to be compressed. The connected-domain-of-pixels dividing unit 620 divides the non-edge portions into a plurality of connected domains of pixels according to color similarity of the pixels in the determined non-edge portions, wherein each of the connected domains of pixels is composed of a pixel selected during the division into the connected domains of pixels and the pixels similar in color to and continuously adjacent to the selected pixel. Then, the color setting unit 630 sets the color of a connected domain of pixels to be the color of the pixel selected for obtaining the connected domain of pixels. The color merging unit 640 merges the colors of the plurality of divided connected domains of pixels according to similarity thereof, wherein connected domains of pixels having similar colors will be merged into one connected domain of pixels having a same color. The compressing unit 650 compresses the image to be compressed by using the merged colors.

Figure 7:
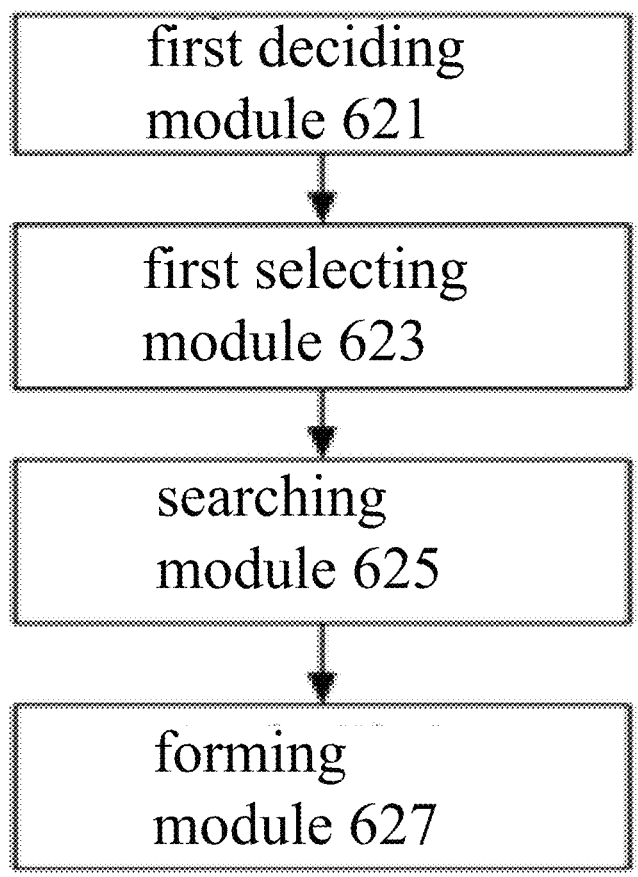
FIG. 7 is a schematic block diagram showing an example of the dividing unit in FIG. 6.

In an example of the present embodiment, the connected-domain-of-pixels dividing unit 620 may further comprises a first deciding module 621, a first selecting module 623, a searching module 625 and a forming module 627, as shown in FIG. 7.

The first deciding module 621 is used for deciding whether all the pixels in a non-edge portion are divided. When it is decided that not all of the pixels are divided, the first selecting module 623 selects a pixel from the remaining pixels that are not divided yet in the non-edge portion. Then the searching module 625 searches pixels similar in color to and continuously adjacent to the selected pixel, starting from the selected pixel. The forming module 627 forms a connected domain of pixels by combining the searched pixels and the selected pixel. Herein, when the first deciding module 621 decides that there exist remaining pixels that are not divided yet, the first deciding module 621, the searching module 625 and the forming module 627 will repeatedly perform treatments on the remaining pixels.

In addition, in another example of the present embodiment, the connected-domain-of-pixels dividing unit 620 may further comprises a similar color deciding module (not shown) for deciding similarity of the colors of the connected domains of pixels. It has been described in details in the description of the above method how to decide the similarity of colors.

Figure 8:
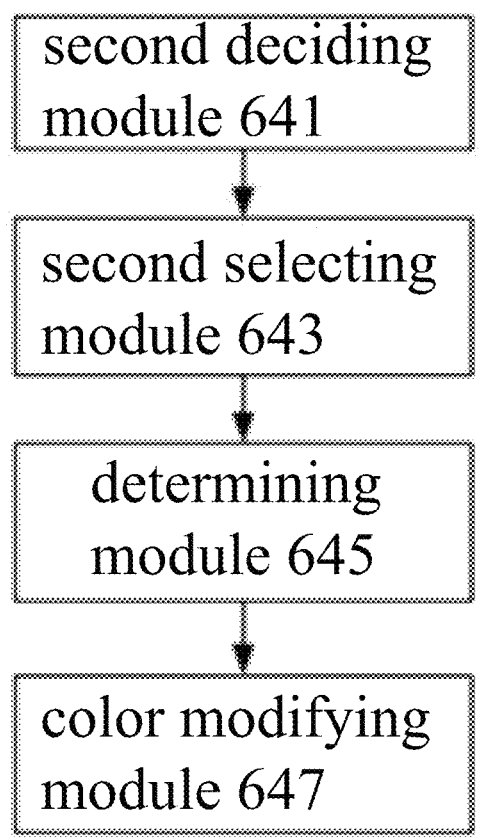
FIG. 8 is a schematic block diagram showing an example of the color merging unit in FIG. 6.

In an example in the present embodiment, the color merging unit 640 may further comprises a second deciding module 641, a second selecting module 643, a determining module 645 and a color modifying module 647, as shown in FIG. 8.

The second deciding module 641 is used for deciding whether all the connected domains of pixels are subject to a color merging process. When it is decided that not all of the connected domains of pixels are subject to a color merging process, the second selecting module 643 selects a connected domain of pixels from the remaining connected domains of pixels that are not subject to a color merging process yet in the plurality of the connected domains of pixels. The determining module 645 determines the connected domains of pixels that are similar in color to the selected connected domain of pixels in the remaining connected domains of pixels. Then, the color modifying module 647 modifies the colors of the connected domains of pixels that are similar in color to the selected connected domain of pixels into the color of the selected connected domain of pixels. Herein, when the second deciding module 641 decides that there exist remaining connected domains of pixels that are not subject to a color merging process yet, the second selecting module 643, the determining module 645 and the color modifying module 647 will repeatedly perform treatments on the remaining connected domains of pixels.

Second Embodiment

Figure 9:
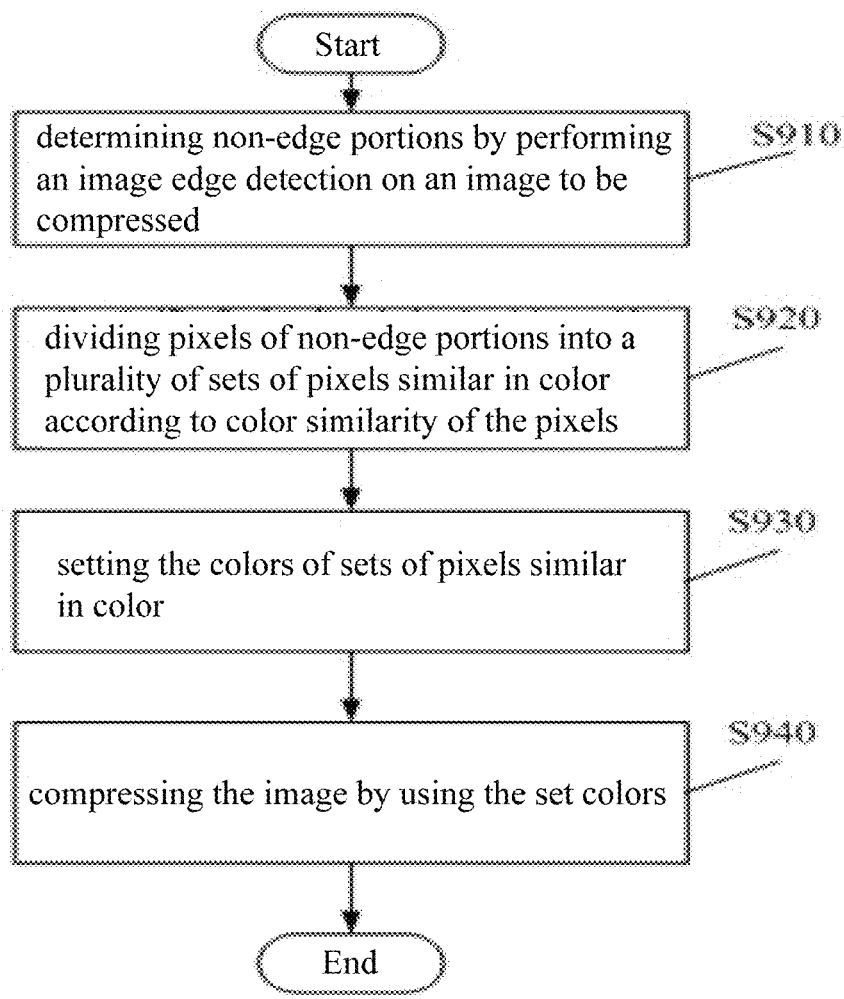
FIG. 9 is a flowchart showing an image compression method according to a second embodiment of the present invention.

FIG. 9 is a flowchart showing an image compression method according to a second embodiment of the present invention.

As shown in FIG. 9, first, in step S910, an image edge detection is performed on an image to be compressed to determine the non-edge portions of the image to be compressed.

Then, in step S920, the pixels in the non-edge portions are grouped into a plurality of sets of pixels similar in color according to the colors of the pixels in the non-edge portions, and the color for each set of pixels similar in color is a color selected from the colors of the pixels in the set. In an example of the present embodiment, for the plurality of grouped sets of pixels similar in color in each of the non-edge portions, the difference between the colors of any two pixels from any two sets of pixels similar in color is greater than or equal to a predetermined threshold, and the difference between the colors of any two pixels from any of the sets of pixels similar in color is less than the predetermined threshold. Pairwise comparisons can be performed for all the pixels in an image, and those pixels can be considered as pixels similar in color and thus grouped into a same set, if the difference between the colors of any two of them is less than a predetermined threshold.

In addition, the pixel grouping process may further comprises: combining two or more pixels from any of the plurality of sets of pixels similar in color into a connected domain of pixels if the two or more pixels are continuously adjacent to each other; selecting a color from the colors of the two or more pixels as the color of the connected domain of pixels.

After the pixels in the non-edge portions are grouped into a plurality of sets of pixels similar in color, in step S930, a color is selected from the colors of the pixels in each of the sets of pixels similar in color as the color of the set. Then, in step S940, the selected colors are used to compress the image.

Figures 10, 11:
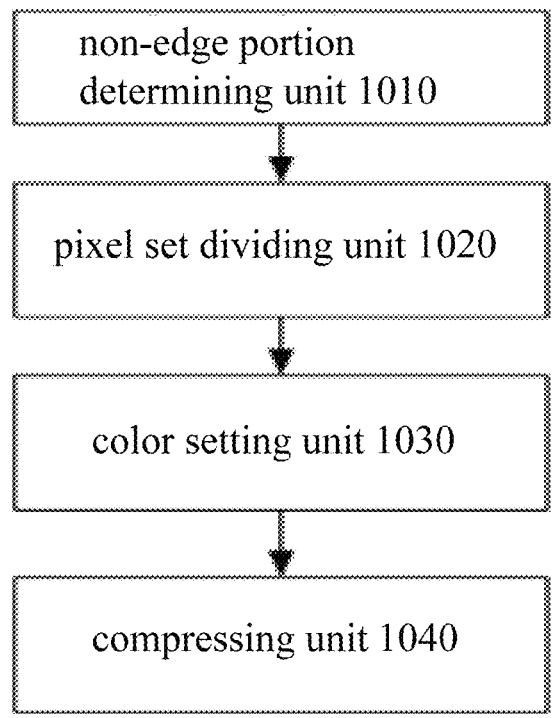
FIG. 10 is a schematic block diagram showing an image compression device according to a second embodiment of the present invention.
FIG. 11 is a schematic block diagram showing a mobile terminal configured with the image compression device in FIG. 6 or FIG. 10 according to the present invention, wherein, like reference numerals indicate like features or functions in all drawings.

FIG. 10 is a schematic block diagram showing an image compression device 1000 according to a second embodiment of the present invention.

As shown in FIG. 10, the image compression device 1000 comprises a non-edge portion determining unit 1010, a pixel set dividing unit 1020, a color setting unit 1030 and a compressing unit 1040.

When an image compression is performed, the non-edge portion determining unit 1010 performs an image edge detection on the image to be compressed to determine the non-edge portions of the image to be compressed. The pixel set dividing unit 1020 groups the pixels in the determined non-edge portions into a plurality of sets of pixels similar in color according to the colors of the pixels in the non-edge portions, the color setting unit 1030 selects a color from the colors of the pixels in each of the sets of pixels similar in color as the color of the set. Then, the compressing unit 1040 compresses the image by using the selected colors.

In an example of the present embodiment, the pixel set dividing unit 1020 may further comprise a computing module for computing the color difference between every two of the pixels in the image; and a similar color deciding module for deciding whether two colors are similar colors according to the color difference between the two colors, wherein the similar color deciding module decides that the two colors are similar colors if the color difference thereof is less than a predetermined threshold.

In another example of the present embodiment, the pixel set dividing unit 1020 may further comprise a connected-domain-of-pixels generating module for combining two or more pixels from any of the plurality of sets of pixels similar in color into a connected domain of pixels if the two or more pixels are continuously adjacent to each other; a domain color determining module for selecting a color from the colors of the two or more pixels as the color of the connected domain of pixels.

FIG. 11 is a schematic block diagram showing a mobile terminal 10 configured with the image compression device 600/1000 in FIG. 6 or FIG. 10 according to the present invention.

In addition, typically, the mobile terminal according to the present invention may be a hand-hold terminal device, for example, a mobile phone, a personal digital assistant (PDA) and so on, therefore, the protection scope of the present invention should not be limited to some specific mobile terminals.

In addition, the method according to the present invention may be realized as computer programs executed by CPU. When the computer programs are executed by CPU, the above mentioned functions defined in the method according to the present invention will be realized.

In addition, the above mentioned steps of the method and units of the system may also be realized by using a controller (e.g. a processor) and a computer readable memory device for storing computer programs that can make the controller realize above mentioned steps or unit functions.

Furthermore, it should be noted that the computer readable memory device (for example, a memory) mentioned herein may be a volatile memory or a non-volatile memory, or may comprise both. As an unrestricted example, the non-volatile memory may comprise read-only memory (ROM), programmable read-only memory (PROM), electrically programmable read-only memory (EPROM), electrically erasable programmable read-only memory (EEPROM), or flash memory. The volatile memory may comprise random access memory (RAM), which can act as an external cache memory. As an unrestricted example, RAM may be realized in various ways, for example, synchronous RAM, dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). The disclosed memory devices are intended to comprise but not limited to these and other appropriate memories.

It will be apparent for those skilled in the art that various exemplified logic blocks, modules, circuits and algorithm steps described in combination with the disclosure may be realized as electronic hardware, computer software or the combination thereof. In order to clearly illustrate the interchangeability between hardware and software, it has been generally described with respect to the functions of various exemplified assemblies, blocks, modules, circuits and steps. Whether the functions are realized with hardware or software depends on specific applications and the design constraints exerted on the whole system. Those skilled in the art may realize the functions in various ways as far as each specific application is concerned, which, however, should not be construed as departing from the scope of the present invention.

Various exemplified logic blocks, modules, and circuits described in combination with the disclosure may be realized by using the following members configured for performing the herein described functions: universal processor, digital signal processor (DSP), application specific integrated circuit (ASIC), field programmable gate array (FPGA) or other programmable logic devices, discrete gate or transistor logic, discrete hardware modules or the combination of any of the devices. The universal processor may be a microprocessor, but alternatively, the processor may be any traditional processor, controller, micro-controller or state machine. The processor may also be realized as a combination of computing devices, for example, a combination of DSP and microprocessor, multiple microprocessors, one or more DSP combining microprocessor core, or any other similar configurations.

The steps of the method or algorithm described in combination with the disclosure may be directly combined in a hardware unit, or in a software module executed by a processor or in the combination thereof. The software module may be stored in a RAM, a flash memory, a ROM, an EPROM, an EEPROM, a register, a hard disk, a mobile hard disk, a CD-ROM or any other store media known to those skilled in the art. An exemplified store medium is connected to a processor so that the processor may read from or write into the medium. Alternatively, the store medium may be integrated with the processor. The processor and the store medium may be embedded in an ASIC. The ASIC may be embedded in a user terminal. Alternatively, the processor and the store medium may be separately embedded in a user terminal.

In one or more exemplified designs, the functions described above may be implemented in hardware, software, firmware, or any combination thereof. If implemented in software, the functions may be implemented as one or more instructions or codes stored on or transmitted over a computer-readable medium. A computer-readable medium includes a computer storage medium and a communication medium wherein the communication medium may include any medium that facilitates transfer of a computer program from one place to another. A storage medium may be any available medium that can be accessed by a general purpose or special purpose computer. As an unrestricted example, the computer-readable medium may comprise RAM, ROM, EEPROM, CD-ROM or other optical disk storage, magnetic disk storage or other magnetic storage devices, or any other medium that can be used to carry or store desired program codes in the form of instructions or data structures and can be accessed by a general purpose or special purpose computer, or a general purpose or special purpose processor. Also, any connection can be properly referred to as a computer-readable medium. For example, if a coaxial cable, a fiber optic cable, a twisted pair, a digital subscriber line (DSL), or a wireless technology such as an infrared, a radio, and a microwave technology are used to transmit a software from a website, a server, or other remote sources, then the coaxial cable, the fiber optic cable, the twisted pair, the DSL, or the wireless technology such as the infrared, the radio, and the microwave technology are all included in the definition of the medium. A magnetic disk and an optical disc as used herein include a compact disc (CD), a laser disc, an optical disc, a digital versatile disc (DVD), a floppy disk and a blu-ray disc, wherein a magnetic disk usually reproduces data magnetically, and an optical disc usually reproduces data optically with lasers. Combinations of the above contents should also be included within the scope of a computer-readable medium.

While an image compression method, an image compression device and a mobile terminal configured with the image compression device according to the present invention have been described hereinbefore in an illustrative way with reference to the drawings, those skilled in the art should understand that various modifications may be made to the image compression method, the image compression device and the mobile terminal according to the present invention without departing from the contents of the present invention. Therefore, the scope of the present invention should be defined by contents of the appended claims.

The invention claimed is:

1. An image compression method, comprising steps of:
   determining non-edge portions of an image to be compressed by performing an image edge detection on the image to be compressed;
   dividing each of the determined non-edge portions into a plurality of connected domains of pixels according to color similarity of the pixels in the non-edge portion, wherein each of the connected domains of pixels is composed of a pixel selected during the division into the connected domains of pixels and pixels similar in color to and continuously adjacent to the selected pixel;
   setting a color of each of the connected domains of pixels to a represented color, wherein the represented color is the color of the pixel selected during the division into the connected domains of pixels;
   building a first compression list including a plurality of entries, wherein each entry corresponds to the represented color of each of the connected domains of pixels;
   performing a color merging process on the entries in the first compression list to obtain a final image compression color list, wherein the represented colors of the connected domains of pixels which are not adjacent and having similar represented colors are modified to a same color; and
   compressing the image to be compressed by using colors in the final image compression color list.

2. The image compression method according to claim 1, wherein the step of dividing each of the determined non-edge portions into a plurality of connected domains of pixels according to color similarity of the pixels in the non-edge portion comprises:
   selecting a pixel from the pixels of the non-edge portion;
   searching pixels similar in color to and continuously adjacent to the selected pixel, starting from the selected pixel;
   forming a connected domain of pixels with the searched pixels and the selected pixel; and
   selecting another pixel in the remaining pixels that are not divided into connected domains of pixels yet and repeating the above procedure of forming a connected domain of pixels, till the pixels in the non-edge portion are all divided into connected domains of pixels.

3. The image compression method according to claim 1, wherein Sobel edge detection algorithm is used to perform the image edge detection on the image to be compressed.

4. The image compression method according to claim 1, wherein the step of performing a color merging process on the entries in the first compression list to obtain a final image compression color list comprises:
   in the first compression list, selecting a connected domain of pixels from the plurality of connected domains of pixels;
   determining connected domains of pixels similar in color to the selected connected domain of pixels from the other connected domains of pixels in the plurality of connected domains of pixels;
   in the final image compression color list, modifying the colors of the connected domains of pixels which are not adjacent and are similar in color to the selected connected domain of pixels into the color of the selected connected domain of pixels; and
   selecting another connected domain of pixels from the remaining connected domains of pixels that are not subject to a color merging process yet and repeating the above procedure, till all the connected domains of pixels are subject to a color merging process.

5. The image compression method according to claim 1, wherein the having similar represented colors is determined by calculating a difference value between two represented colors.

6. The image compression method according to claim 5, wherein two represented colors are similar if the difference value between the two represented colors is less than a predetermined threshold.

7. An image compression device, comprising:
   a non-edge portion determining unit for determining non-edge portions of an image to be compressed by performing an image edge detection on the image to be compressed;
   a connected-domain-of-pixels dividing unit for dividing each of the determined non-edge portions into a plurality of connected domains of pixels according to color similarity of the pixels in the non-edge portion, wherein each of the connected domains of pixels is composed of a pixel selected during the division into the connected domains of pixels and pixels similar in color to and continuously adjacent to the selected pixel;
   a color setting unit for setting a color of each of the connected domains of pixels to a represented color, wherein the represented color is the color of the pixel selected during the division into the connected domains of pixels;
   a color merging unit for building a first compression list including a plurality of entries, wherein each entry corresponds to the represented color of each of the connected domains of pixels; and performing a color merging process on the entries in the first compression list to obtain a final image compression color list, wherein the represented colors of the connected domains of pixels which are not adjacent and having similar represented colors are modified to a same color; and a compressing unit for compressing the image to be compressed by using colors in the final image compression color list.

8. The image compression device according to claim 7, wherein the connected-domain-of-pixels dividing unit comprises:

a first selecting module for selecting a pixel from the pixels of the non-edge portion;

a searching module for searching pixels similar in color to and continuously adjacent to the selected pixel, starting from the selected pixel;

a forming module for forming a connected domain of pixels with the searched pixels and the selected pixel;

a first deciding module for deciding whether all the pixels in the non-edge portion are divided, wherein if the first deciding module decides that there exist remaining pixels that are not divided yet, the first selecting module, the searching module and the forming module repeatedly performs treatments on the remaining pixels.

9. The image compression device according to claim 8, wherein the color merging unit comprises:

a second selecting module for selecting a connected domain of pixels from the plurality of connected domains of pixels in the first compression list;

a determining module for determining connected domains of pixels similar in color to the selected connected domain of pixels from the other connected domains of pixels in the plurality of connected domains of pixels;

a color modifying module for modifying the colors of the connected domains of pixels which are not adjacent and are similar in color to the selected connected domain of pixels into the color of the selected connected domain of pixels in the final image compression color list; and a second deciding module for deciding whether all the connected domains of pixels are subject to a color merging process, wherein if the second deciding module decides that there exist remaining connected domains of pixels that are not subject to a color merging process yet, the second selecting module, the determining module and the color modifying module repeatedly performs treatments on the remaining connected domains of pixels.

10. The image compression device according to claim 7, wherein the having similar represented colors is determined by calculating a difference value between two represented colors.

11. The image compression device according to claim 10, wherein two represented colors are similar if the difference value between the two represented colors is less than a predetermined threshold.

12. A mobile terminal, comprising the image compression device according to claim 7.

* * * * *